United States Patent Office 3,560,539
Patented Feb. 2, 1971

3,560,539
SELECTIVE CATALYST RECOVERY
Frank B. Booth, Placentia, Calif., assignor to Union Oil Company of California, Los Angeles, Calif.
No Drawing. Filed Aug. 21, 1968, Ser. No. 754,482
Int. Cl. C07f *15/00;* C07c *45/02;* B01i *11/03*
U.S. Cl. 260—429                                    7 Claims

ABSTRACT OF THE DISCLOSURE

A method for the recovery of complexes of Group VIII noble metals and biphyllic ligands from hydrocarbons or high boiling residues formed in hydrocarbonylation of olefins. The Group VIII noble metal is recovered in accordance by reduction of the high boiling fraction of a hydroformylation reaction medium to convert the aldehyde groups thereto to alcohols. This reduction is effected by treatment with conventional means, e.g., hydrogenation in the presence of heterogeneous hydrogenation catalysts at a temperature from about 25° to 325° C. or by nucleophilic attack by hydride ion by treatment at mild conditions with an alkali metal aluminum hydride or borohydride. The metal complex is essentially insoluble in the resulting alcohol tar and the catalyst precipitate is recovered by conventional solid-liquid separation techniques, e.g., filtration or centrifugation.

DESCRIPTION OF THE INVENTION

The invention relates to a method for the recovery of Group VIII noble metal values from organic solvents. The invention further relates to the recovery of complexes of Group VIII noble metals with trihydrocarbyl ligands from a reaction medium used in the hydroformylation of olefins to carbonyls to remove the catalyst therefrom prior to discard of a portion of the reaction medium containing the tarry and high boiling carbonyl byproducts formed during the reaction.

Recent advances in homogeneous catalysis of hydroformylation have included the preparation and use of soluble complexes of Group VIII noble metals and biphyllic ligands such as the trihydrocarbyl phosphines, phosphites, stibines, arsines and bismuthines. Hydroformylations unavoidably encounter the formation of high boiling byproducts of the reaction, e.g., tars and high boiling aldol condensation products, and the commercial adoption of the aforementioned hydroformylation requires the removal and discard of a portion of the reaction medium to avoid excessive accumulation of the high boiling products. The expense of the aforementioned highly active catalyst, however, prohibits its discard. Accordingly, it is desirable that a method be devised for the economical recovery of the homogeneous Group VIII noble metal-trihydrocarbyl ligand complexes.

It is an object of this invention to provide a method for the recovery of Group VIII noble metal values from non-polar organic solvents.

It is a further object of this invention to provide a method for the recovery of Group VIII noble metal complexes of biphyllic ligands.

It is a further object of this invention to provide a method for the recovery of complexes of Group VIII noble metals and trihydrocarbyl ligands employed in hydrogenation or hydroformylation reactions.

It is an additional object of this invention to provide a method for the recovery of Group VIII noble metal complexes of trihydrocarbyl ligands from non-polar solvents containing tars and high boiling byproducts.

It is a further object of this invention to provide a method for the recovery of the catalyst values as a step in a comprehensive method to remove tar and high boiling byproducts from a hydroformylation reaction using a Group VIII noble metal-trihydrocarbyl ligand complex.

I have now found that a Group VIII noble metal can be substantially completely recovered from an organic non-polar solvent or from a hydroformylation reaction residue where the Group VIII noble metal exists as a soluble complex with a biphyllic ligand by reduction of the carbonyl content of the tar to hydroxyl groups. The reduction can be performed with alkali metal borohydrides or aluminum hydrides at ambient conditions including temperatures from about 10° to about 325° C., preferably from 20° to 100° C., and pressures from about 1 to 1000 atmospheres, sufficient at the treatment temperature to maintain liquid phase conditions during said contacting. The reduction can also be effected by treatment with hydrogen in the presence of heterogeneous hydrogenation catalysts such as platinum, palladium or Raney nickel supported on an inert, particulate solid at temperatures from about 10° to about 325° C., preferably from 75° C. to about 300° C. and at the aforeindicated pressures wherein hydrogen comprises from 25 to 100 percent of the gas phase. The metal complex is precipitated from the resulting hydrogenated residue and can be separated therefrom by conventional means, e.g., filtration or centrifugation.

The process of hydrocarbonylation wherein my invention can be applied includes that described in copending applications Ser. Nos. 518,562, now abandoned, 642,191 and 746,287. The process comprises contacting an olefin, carbon monoxide and hydrogen with a liquid reaction medium containing a homogeneous catalyst at temperatures from about 20° to about 300° C. and pressures from 1 to about 1000 atmospheres. In the first of the aforementioned applications the catalyst described is a Group VIII noble metal halide complex with carbon monoxide and a biphyllic ligand. Also included in the reaction medium is a cocatalyst comprising a polycyclic, heterocyclic, saturated amine having at least one nitrogen in a bridgehead position. In the other application aforementioned, the catalyst described is a Group VIII noble metal hydride complex with carbon monoxide and a biphyllic ligand.

The biphyllic ligands are organic compounds capable of forming a complex with the catalyst by coordinate covalent bonding and have one atom with an unshared pair of electrons for such bonding. These can be organic compounds of trivalent phosphorus, antimony, arsenic and bismuth. Typically, the biphyllic ligand is an aromatic phosphine such as triphenylphosphine.

During hydroformylation there occurs a slight but continuous accumulation of high boiling byproducts and tar which remain in the bottoms from the distillation zone used to recover the products. These are recycled to the reaction zone with the bottoms stream which also contains the catalyst. In accordance with my invention all or a portion of this liquid residue fraction is reduced to convert most or all, e.g., from 75 to 100 percent, of its carbonyl content to hydroxyls, thereby changing the solvent properties of the residue to the point where the catalyst complex becomes insoluble and precipitates therefrom.

The metal values are precipitated from the high boiling hydroformylation byproducts. To reduce the volume of material to be treated, I perfer to evaporate all volatilizable components from the reaction medium by vacuum distillation at temperatures from 95° to 225° C. at a pressure from 1 to 250 millimeters mercury. When the resulting vacuum residue is too viscous for facile treatment it can be diluted with an alcohol such as those hereafter described as hydroformylation solvents.

HYDROFORMYLATION SOLVENTS

Solvents which are suitable as reaction solvents for the hydroformylation reaction include organic liquids which are inert to the olefin, hydrogen and olefinic reactants, to the catalysts and high boiling reaction residue. These solvents include hydrocarbons, alkyl ethers, carboxylic acids, amides and alkyl esters of carboxylic acids, dialkyl sulfoxides and alcohols.

Examples of the hydrocarbons that can be employed include aromatic hydrocarbons such as benzene, toluene, xylene, ethylbenzene, tetralin, etc.; aliphatic hydrocarbons such as butane, pentane, isopentane, hexane, isohexane, heptane, octane, isooctane, naphtha, gasoline, kerosene, mineral oil, etc.; alicyclic hydrocarbons, e.g., cyclopentane, cyclohexane methylcyclopentane, decalin, indane, etc.

Ethers which can be employed include the $C_1$-$C_6$ alkyl ethers of $C_1$-$C_6$ alkanols and glycols such as diisopropyl ether, di-n-butyl ether, ethylene glycol dibutyl ether, diisoamyl ether, methylhexyl ether, methylamyl ether, dichloroethyl ether, ethylene glycol diisoamyl ether, diethylene glycol diethyl ether, ethyl isopropyl ether, diethylene glycol, diethyl ether, diethylene glycol dimethyl ether, ethylene glycol dibutyl ether, ethylene glycol diamyl ether, triethylene glycol diethyl ether, diethylene glycol di-n-hexyl ether, tetraethylene glycol dimethyl ether, tetraethylene glycol dibutyl ether, etc.

Carboxylic acids that can be used include the hydrocarbon alkanoic acids having from 2 to about 12 carbons such as acetic, propionic, butyric, valeric, pivalic, caproic, caprylic, decanoic, lauric, etc. Preferred acids are those containing from 2 to about 5 carbons.

The esters of formic acid and the aforementioned hydrocarbon alkanoic acids and alkanols and alkanediols having from 1 to about 10 carbons can also be used as solvents. Examples of this class of solvents include ethylformate, methyl acetate, ethyl acetate, n-propyl formate, isopropyl acetate, ethyl proprionate, n-propyl acetate, sec-butyl acetate, isobutyl acetate, ethyl n-butyrate, n-butyl acetate, isoamyl acetate, n-amyl acetate, ethylene glycol diacetate, glycol butyrate, isoamyl n-butyrate, isoamyl isovalerate, etc. A preferred class of ester solvents includes the lactones, e.g., butyrolactone, valerolactone and their derivatives having lower ($C_1$-$C_5$) alkyl substituents.

The amides of formic acid and the aforementioned hydrocarbon alkanoic acids can also be used as solvents. Examples include the simple amides as well as the N-alkyl and N,N-dialkyl substituted amides, e.g., dimethyl formamide, N-methylacetamide, N-amylpropionamide, N,N-dimethylbutyramide, N-methylvaleramide, N-isopropylhexanoic amide, N,N-dimethyl heptanoic amide, octanoic amide, N-methyl nonanoic amide, decanoic amide, etc. Alkyl sulfoxides can also be used as the suitable solvent and suitable examples include those with $C_1$ to $C_{10}$ alkyl groups such as dimethyl sulfoxide, diethyl sulfoxide, diisopropyl sulfoxide, diamyl-sulfoxide, methyldecyl sulfoxide, ethylnonyl sulfoxide, isopropylhexyl sulfoxide, ethylhexylsulfoxides, etc.

Alcohols can also be employed as solvents. Preferably tertiary alcohols are employed since these materials are substantially non-reactive under the hydrocarbonylation conditions. Primary and secondary alcohols can be employed but are less preferred since these materials can react with aldehyde compounds under the reaction conditions to produce acetals. While in some instances these may be desired products, it is generally desirable to produce the carbonyl compound or alcohol directly without the formation of the acetal. It is of course apparent that, if desired, the acetal can be hydrolyzed to obtain the aldehyde. Examples of alcohols that can be employed as solvents include the aliphatic and alicyclic alcohols such as methanol, ethanol, isopropanol, butanol, t-butanol, t-amyl alcohol, hexanol, cyclohexanol, etc.

GROUP VIII NOBLE METAL

The Group VIII noble metal is present in the aforementioned organic solvents as a metal hydride or salt, typically a halide, in complex association with carbon monoxide and a biphyllic ligand. There can also be incorporated in the reaction solution a polycyclic, heterocyclic amine having a nitrogen in at least one bridgehead position. Examples of Group VIII noble metal hydrides, carbonyls or salts include those which are commercially available. Examples of suitable sources of the metal values are as follows: bis(triphenylphosphine)iridium carbonyl chloride; tris(triphenylphosphine)iridium carbonyl hydride; iridium carbonyl; iridium tetrabromide; iridium tribromide; iridium trifluoride; iridium trichloride; osmium trichloride; chloroosmic acid; palladium hydride; palladous chloride; palladous cyanide; palladous iodide; palladous nitrate; platinic acid; platinous iodide; palladium cyanide; sodium hexachloroplatinate; potassium trichloro(ethylene)platinate(II); chloropentaaminorhodium(III)chloride; rhodium dicarbonyl chloride dimer; rhodium nitrate; rhodium trichloride; tris(triphenylphosphine)rhodium carbonyl hydride; tris(triphenylphosphine)rhodium(I)chloride; ruthenium trichloride; tetraaminorutheniumhydroxychloro chloride, etc. Other suitable salts of Group VIII noble metals include carboxylates of $C_2$-$C_{10}$ acids, e.g., palladium acetate, osmium octoate, etc., as well as iridium sulfate, ruthenium nitrate, etc.

LIGAND

The metal is present in complex association with a biphyllic ligand, i.e., a trihydrocarbyl ligand. The ligand is a compound having at least one atom with a pair of electrons capable of forming a coordinate covalent bond with a metal atom and simultaneously having the ability to accept the electron from the metal, thereby imparting additional stability to the resulting complex. Biphyllic ligands can comprise organic compounds having at least about 3 carbons and containing arsenic, antimony, phosphorus or bismuth in a trivalent state. Of these, the phosphines are preferred; however, phosphites, arsines, stibines and bismuthines can also be employed. In general these biphyllic ligands have the following formula:

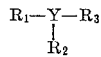

wherein:

Y is As, Sb, P, Bi or P(O)₃;

$R_1$ and $R_2$ are hydrogen, alkyl from 1 to about 8 carbons, aryl from 6 to about 9 carbons or amino, or halo substitution products thereof; and $R_3$ is alkyl from 1 to 8 carbons, aryl from 6 to 8 carbons or

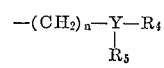

wherein:

$n$ is from 1 to about 6; and $R_4$ and $R_5$ are alkyl from 1 to about 8 carbons or aryl from 6 to about 9 carbons.

Examples of suitable biphyllic ligands useful in my invention to stabilize the catalyst composition are the following: trimethylphosphine, trimethylphosphite, triethylarsine, triethylbismuthine, triisopropylstibine, chlorodiethylphosphine, chlorodipropylarsine, tri(aminobutyl)arsine, tris(aminoamyl)phosphine, ethyldiisopropylstibine, tricyclohexylphosphine, tri(aminocyclohexyl)stibine, triphenylphosphine, triphenylphosphite, triphenylbismuthine, tris(N,N - dimethylanilyl)phosphine, tris(o - tolyl) phosphine, triphenylbismuthine, tris(2-ethylhexyl)arsine, tris (methylcyclopenyl) stibine, tris (chlorophenyl) bismuthine, trianilylbismuthine, phenyldiisopropylphosphine, phenyldiamylphosphine, ethyldiphenylphosphine, chlorodixylylphosphine, chlorodiphenylphosphite, tris(N,N-diethylaminoethyl)phosphine, ethylene bis(diphenylphosphine), tritolylphosphine, tricyclohexylphosphite, tris-(methylcyclopentyl)arsine, tritolylstibine, hexamethylene bis(diisopropylarsine), pentamethylene bis(diethylstibine), diphenyl(N,N-dimethylanilinyl)phosphine, triphenylanilylethylenediphosphine, trianilinylphosphine, tris(3,5-diaminophenyl)phosphine, trianilinylarsine, anilinyldiphenylbismuthine, aminoethyltriisopropylhexamethyldiphosphine, chlorophenyltriphenylpentamethylenediarsine, tetraethylethylenedibismuthine, tetraphenylethylenediphosphite, tetramethyltrimethylenedistibine, etc. Of the aforementioned, the aryl phosphines are preferred with Group VIII noble metals because of the demonstrated greater hydroformylation activity of the noble metal catalysts comprising the aryl phosphines.

METAL COMPLEX

As previously mentioned, some of the Group VIII noble metal-biphyllic ligand complexes are commercially available. Others can be prepared in the manner described in the aforecited copending applications or in the manner described in U.S. Pat. 3,102,899. In the preparation, the metal complex is readily formed upon admixture of the metal, salt, hydride or a complex thereof with a solution of the biphyllic ligand which, preferably, is used in excess of the stoichiometric quantity present in the complex. To obtain various oxidation states of the metal in the complex, oxidizing or reducing treatments can be employed such as treatment of the complex with oxygen or a reducing agent such as hydrogen, carbon monoxide, hydrazine, alkali metal, e.g., sodium, potassium, lithium, etc., dithionites or borohydrides. Preferably the metal is complexed in an elevated valency and its various oxidation states are achieved by treatment with any of the aforementioned reducing agents at a temperature from 25° to about 175° C. and pressures from 1 to about 100 atmospheres the superatmospheric pressures being preferred with the gaseous reducing agents.

HYDROFORMYLATION REACTION

This invention has particular value in application to the treatment of the high boiling byproduct or residue formed in the hydroformylation reaction. In this reaction an ethyleneically unsaturated compound is carbonylated or hydroformylated by contacting it with hydrogen and carbon monoxide in the presence of an inert liquid phase of a non-polar organic solvent containing dissolved quantities of the aforementioned Group VIII noble metals in complex association with biphyllic ligand. The olefin, carbon monoxide and hydrogen are contacted with the liquid reaction medium at temperatures from about 20° to about 300° C. and pressures from 1 to about 100 atmospheres. The high boiling tars and byproducts of the reaction accumulate in the reaction medium and are concentrated in the residue remaining from the distillation of the reatcion medium in the distillative recovery of the products. The bulk of the distillate residue comprises reaction solvent, catalyst and the accumulated high boiling byproducts and this residue is removed from the distillation zone and recycled to further contacting.

The residue is treated in accordance with my invention by removing from about 1 to about 25 percent of the residue and treating this removed residue to precipitate the catalyst values therefrom. Prior to the reductive treatment of the removed portion of the reaction residue, the residue can be further concentrated by distillation at subatmospheric pressures, e.g., distillation at a temperature from 90° to 225° C. and from 1 to 600 millimeters mercury pressure, preferably from 10 to about 250 millimeters mercury, to remove additional quantities of the reaction solvent which can be returned to the reaction zone.

The ethylenically unsaturated compound carbonylated in accordance with my invention can comprise any olefin having from 2 to about 25 carbons; preferably from 2 to about 18 carbons. This olefin has the following structure:

$$R_2R_1C=CR_3R_4$$

wherein $R_1$, $R_2$, $R_3$ and $R_4$ are hydrogen, alkyl, cycloalkyl, aryl, alkaryl, aralkyl, or wherein one of said $R_1$ and $R_2$ and one of said $R_3$ and $R_4$ together form a single alkylene group having from 2 to about 8 carbons.

Examples of useful olefins are the hydrocarbon olefins such as ethylene, propylene, butene-1, butene-2, 2-methylbutene-1, cyclobutene, hexene-1, hexene-2, cyclohexene, 3-ethylhexene-1, isobutylene, octene-1, 2-propylhexene-1, ethylcyclohexene, decene-1, cycloheptene, cyclooctene, cyclononene, 4,4'-dimethylnonene - 1, dodecene - 1, undecene-3, 6-propyldecene-1, tetradecene-2, 7-amyl-decene-1, oligomers of olefins such as propylene tetramer, ethylene trimer, etc., hexadecene-1, 4-ethyltridecene-1, octadecene-1, 5,5-dipropyldodecene-1, vinylcyclohexane, allylcyclohexane, styrene, p-methylstyrene, alpha-methylstyrene, p-vinylcumene, beta-vinyl-naphthalene, 1,1-diphenylethylene, allylbenzene, 6-phenylhexene-1, 1,3-diphenylbutene-1, 3-benzylheptene-1, o-vinyl-p-xylene, m-hexylstyrene, divinylbenzene, 1-allyl-4-vinylbenzene, p-amylstyrene, allylcumene, allylxylene, allyltoluene, etc. Of the preceding the alpha olefins and olefins having 2 to about 12 carbons are preferred classes.

As previously mentioned a cocatalyst which can be employed with the Group VIII noble metal halide catalyst for the hydroformylation reaction is a poly(heterocyclic)amine having at least one nitrogen in a bridgehead position. The term "bridgehead position" is well established in chemical nomenclature to identify the position of an atom which is common to at least two of the rings of the polycyclic compound. Preferably the amine is an atom-bridged system, i.e., atoms, generally methylene carbons, form the bridge or link in the molecule rather than a simple valence bonding. The amine can be used also in catalytic amounts, e.g., from about 0.001 to about 10 weight percent; preferably from about 0.05 to 5 weight percent of the liquid reaction medium. In general, amines having from 1 to about 4 nitrogen atoms and from 1 to about 25 carbons; preferably from 2 to about 10 carbons; can be employed for this purpose and the following is a listing of representative amines useful in my invention: 1,2,4-triazabicyclo(1.1.1)pentane; 1,5,6-triazabicyclo(2.1.1.)hexane; 5 - oxa - 1,6 - diazabicyclo (2.1.1)hexane; 5 - thia - 1,6 - diazabicyclo(2.1.1)hexane; 2 - oxa - 1,5,6 - triazabicyclo(2.1.1)hexane; 1,2,5,6-tetrazabicyclo(2.1.1)hexane; 5 - oxa - 1,2,3,6 - tetrazabicyclo (2.1.1)hexane; 1 - azabicyclo(3.3.1)heptane; 1 - azabicyclo(2.2.1)heptane; 1,4 - methano - 1,1 - pyridine; 2 - ox - 1 - azabicyclo(2.2.1)heptane; 1,4 - diazabicyclo(2.2.1) heptane; 7 - oxa - 1 - azabicyclo(2.2.1)heptane; 7 - thia - 1 - azabicyclo(2.2.1)heptane; 1,7 - diazabicyclo(2.2.1) heptane; 1,3,5 - triazabicyclo(2.2.1)heptane; 1 - azabicyclo(3.2.1)octane; 1,5 - diazatricyclo(4.2.1)decane; 1,7-diazatricyclo(3.3.1.2)undecane; 7-ox-1-azabicyclo(3.2.1) octane; 1,7 - diazabicyclo(3.2.1)octane; 3 - thia - 1,7 - diazabicyclo(3.2.1)octane; 1,3,6,8 - tetrazatricyclo(6.2.1) dodecane; 2,8 - diazatricyclo(7.3.1.1)tetradecane; 1 - azabicyclo(3.3.1)nonene, also known as 1-isogranatinine and the oxo, hydroxy and lower alkyl derivatives thereof; 1-azabicyclo(2.2.2)octane also known as quinuclidine as well as the halo, oxo, hydroxy and lower alkyl derivatives thereof; 1 - azatricyclo(3.3.1.1)decane; 1,3 - diazabicyclo(2.2.2)octane; 1,3 - diazabicyclo(3.3.1)nonene; 1,6 - diazatricyclo(5.3.1)dodecane; 2 - ox - 1 - azabicyclo(2.2.2)octane; 4,6,10 - triox - 1 - azatricyclo(3.3.1) decane; 1,5 - diazabicyclo(3.3.1)nonene; 1,2,5,8 - tetrazatricyclo(5.3.1.1)dodecane; 1,4 - diazabicyclo(2.2.2)octane also known as triethylene diamine and its oxo, hydroxy, halo and lower alkyl derivatives thereof; 1,3-diazatricyclo(3.3.1.1)decane also known as 1,3-diazadamantane; 1,3,5 - triazatricyclo(3.3.1)decane; 1,3,5,7 - tetrazabicyclo(3.3.1)nonene also known as pentamethylene tetramine; 1,3,5,7 - tetrazatricyclo(3.3.1.1)decane also known as hexamethylenetetramine; 2 - oxa - 1,3,4 - triazabicyclo(3.3.1)nonene; 1 - azabicyclo(4.3.1)decane; 1 - azabicyclo(3.2.2)nonene; 1,5 - diazabicyclo(3.2.2) nonene; 1,3,5,7 - tetrazabicyclo(3.3.2)decane; 1,5-diazabicyclo(3.3.3)undecane, etc.

Of the aforementioned poly(heterocyclic)amines having a nitrogen in a bridgehead position the most common and widely known compound is 1,4-diazabicyclo(2.2.2) octane (triethylenediamine) and this material as well as its oxo, hydroxy, halo and lower alkyl derivatives comprises the preferred cocatalyst for use in my process.

REDUCTIVE TREATMENT

The reaction residue containing the catalyst metal values is treated in accordance with my invention to reduce the carbonyl content of the residue to hydroxyl groups. The amount of the reaction medium that is treated in accordance with the invention comprises that amount sufficient to maintain the reaction medium content of tar and high-boiling byproducts relatively constant and this amount can comprise the continuous treatment of from 1 to about 25 percent of the reaction medium. During the hydroformylation, the portion for the reductive treatment can be withdrawn from the process, typically from the recycle stream returning the reaction medium and catalyst from the product distillation zone to the reactor. The amount to be subjected to the reductive treatment and catalyst recovery comprises the aforeindicated 1 to 25 percent of the reaction medium, and this portion is reduced by treatment with hydrogen under catalytic conditions or by treatment with various alkali metal borohydrides or aluminum hydrides.

The carbonyl content of the residue can be readily converted to hydroxyl groups by mild hydrogenation, preferably in the presence of a heterogeneous catalyst. Various metals or oxides of metals can be used as the catalytic agent. Typical catalysts include Group VI and/ or Group VIII metals or oxides such as chromium, tungsten or molybdenum or oxides thereof, or iron, cobalt or nickel as metals or oxides thereof. The Group VIII noble metals or oxides can also be used, e.g., platinum, osmium, iridium, palladium, ruthenium or rhodium metals or oxides. These metals or oxides can be stabilized or promoted with conventional cocatalysts such as barium or copper in the metallic or oxide state and can be employed neat or can be supported or distended on any suitable inert, particulate solid. Any solid that is inert to the reaction can be used, such as titania, zirconia, alumina, silica, etc., or a combination of these materials. Suitable examples include alumina, silica stabilized alumina containing from 1 to 15 percent silica as described in U.S. Pat 2,437,532, the aluminum silicates, clay, naturally occurring or synthetically prepared zeolites such as chabazite, gnelenite or faujasite, as well as synthetic zeolites. The latter materials are partially dehydrated crystalline compositions of silica and alumina and contain quantities of one or more exchangeable cations such as sodium, potassium, hydrogen, magnesium, calcium, etc. The compositions and their preparation are described in U.S. Pats. 2,882,243 and 2,882,244. These compositions are characterized by crystal pores of relatively uniform pore diameter between about 5 and 14 Angstrom units. The sieves can be treated prior to deposition of the aforementioned catalytic metals by ion exchanging the monovalent alkali metal cation with a divalent metal. Also the sieves can be "decationized" by ion exchange with an ammonium salt followed by heating to decompose the zeolitic ammonium ion and leave a hydrogen ion. Any of the aforementioned carriers can be impregnated with appropriate aqueous solutions of the Group VIII metal salts in the manner hereafter set forth.

The catalyst particle size can vary over wide limits from about 0.5 inch to about 1 micron average diameter. The particle size selected depends on the type of contacting employed in the hydrogenation zone. A disperse solid contacting would employ the very fine particles passing about a 325 mesh screen. Packed bed reactors, which are preferred, would use the larger diameter particles having diameters from 0.05 to 0.5 inch, preferably from about 0.1 to 0.25 inch. The specific surface of the catalyst can also vary widely, from about 10 to 800 square meters per gram.

The metal active for the hydrogenation catalysts can be employed on the solid inert carrier in an amount comprising from about 0.01 to about 25 weight percent of the heterogeneous catalyst. Preferably the catalytic reactive metal is employed in a concentration from about 0.5 to about 5 weight percent based on the final catalyst and is distended on the carrier by impregnation of the carrier with a solution of a complex or salt of the metal or by precipitation and reduction of the metal. In a typical impregnation, the solid carrier can be immersed in a solution of a soluble salt of the catalytically active metal and the solvent can be evaporated therefrom to precipitate the metal salt on the carrier. The resulting catalyst can be dried and, if desired, repeated impregnations can be employed to raise the concentration of the hydrogenation catalyst to the desired level in accordance with conventional practice in the art of the preparation of catalysts. The metal salt then can be reduced to the metal by treatment with hydrogen or oxidized by treatment with oxygen at a temperature from 125° to 800° C.

The residue is treated with the heterogeneous catalyst at temperatures from 10° to 325° C., preferably from 75° to about 300° C. and pressures from 1 to 10,000 atmospheres, preferably from 20 to 1000, and most preferably from 50 to 750 atmospheres. The partial pressure of hydrogen during this treatment can be from 25 to about 100, preferably from about 50 to 85 percent of the total pressure in the hydrogenation zone.

The hydrogenation treatment precipitates the catalyst from the liquid residue undergoing treatment and some or all of the precipitate will be trapped on the solid, e.g., will be occluded in the fixed bed of catalyst particles or will be adsorbed on the solid particles when fluidized or suspended heterogeneous contacting is employed. The liquid effluent from the hydrogenation zone can be cooled and any remaining solids contained therein permitted to settle or can be treated as hereinafter described to recover any residual precipitates of catalysts that may be present in this effluent. Any solid which is occluded in the packed heterogeneous catalyst bed or adsorbed on the particulate catalyst can be dissolved therefrom by washing the solid with any of the aforementioned solvents and this treatment can be effected at any temperature within the aforeindicated treatment temperatures for the hydrogenation reaction. When a packed bed reactor is used for the heterogeneous catalysis the precipitated solid can be washed from the bed simply by backflushing or counterwashing the bed with the solvent.

An alternative reductive treatment comprises contacting the residue under liquid phase conditions with a suitable hydride which causes the nucleophilic hydride attack on the carbonyls of the residue and results in conversion of the carbonyls to hydroxyl groups. This treatment can be performed by contacting the aforementioned quantities of residue with an alkali metal aluminum hydride or borohydride, e.g., sodium aluminum hydride, lithium borohydride, potassium aluminum hydride, cesium borohydride, rubidium aluminum hydride, etc. This treatment is effected under liquid phase conditions and if desired the residue can be admixed with from 0.1 to 10 parts by volume of any of the aforementioned alcoholic solvents per part by volume of the reaction residue. Preferably, however, the residue after evaporation of the solvent is used directly without further dilution. The residue is treated with a sufficient quantity of the hydride source to insure that from 75 to 100 percent of the carbonyl groups are reduced to hydroxyl groups. This amount generally comprises from about ½ to about 2 stoichiometric weight equivalents of the particular hydride per weight equivalent of carbonyl content in the residue.

The treatment is effected under liquid phase conditions at relatively mild conditions, preferably at ambient conditions. The temperatures of treatment can be from 10° to 325° C., preferably from 20° to about 125° C. and the pressure can be from 1 to 10,000 atmospheres although it is preferred to employ only sufficient pressure to insure liquid phase conditions, e.g., from about 1 to about 10 atmospheres pressure.

Upon completion of either of the aforedescribed reductive treatments, the catalyst precipitate can be readily recovered from the liquid residue. The recovery can be effected by any conventionally employed technique for the separation of solids from liquids. The solid can be permitted to settle from the liquid phase and the latter can be decanted from the solid or the entire residue can be filtered using conventional filtration equipment, e.g., conventional rotary or plate vacuum or pressure filtration. Alternatively, the liquid residue can be centrifuged in a conventional centrifuge to accelerate the settling and the clarified liquid can be decanted from the solid precipitate separated in the centrifuging step.

Upon separation of the liquid phase from the solid precipitate, the liquid phase can be discarded from the process while the solid can be dissolved in any of the aforementioned solvents for recycling to the reaction zone. This reductive treatment and separation can effect up to 99 percent recovery of the precious metal catalyst from the residue prior to its discarding, thereby permitting the commercial adaptation of the processes based on use of these precious metal catalysts.

The invention will now be described by reference to illustrated modes of practice of the invention:

EXAMPLE 1

A residue typical of that obtained by vacuum distillation at 105° C. and 0.3 millimeters mercury pressure of the reaction medium from a hydroformylation of octene-1 using a rhodium hydride carbonyl tris-triphenylphosphine complex is treated in this experiment. The residue which is essentially aldol polymers contains 30.5 grams $RhHCO[(C_6H_5)_3P]_3$ per liter. Methanol is added to 40 milliliters of the residue to obtain 120 milliliters of diluted residue and 50 milliliters of the diluted residue and 2 grams triphenylphosphine are placed in a liter flask, heated to reflux temperature and 1.5 grams sodium borohydride dissolved in 15 milliliters of water are slowly added. The mixture is refluxed for 15 minutes then cooled to obtain two phases. The upper phase is decanted from the flask and 38 milliliters of the lower phase are centrifuged to obtain a clear supernatant liquid and a solid. The treatment with the hydride effects substantially complete conversion of the carbonyls of the aldo polymers to hydroxyl groups.

The solid is dissolved in toluene and samples of the upper phase removed from the one liter flask, the supernatant liquid from the centrifuge and the toluene solution are analyzed for rhodium content by flame photometry to determine that the treatment with sodium borohydride effected 98.6 percent elimination of the rhodium from the residue and the overall recovery of rhodium in the toluene solution was 95 percent.

The experiment is repeated on a reaction medium from the hydroformylation of octene-1 using a rhodium hydride carbonyl tris-triphenylphosphine complex catalyst. The reaction medium is distilled under vacuum to remove 475 milliliters of distillate from 500 milliliters of the reaction medium. The residue is diluted to 60 milliliters with methanol and analyzed to determine its rhodium content to be 1433 milligrams per liter.

Into a liter flask is placed 56 milliliters of the diluted residue, the flask contents are heated to reflux temperature and 4 milliliters of an aqueous solution of 1.75 molal sodium borohydride are added. The flask contents are cooled to room temperature and filtered and the solid is washed with methanol. The filtrate comprising 114 milliliters is analyzed and found to contain 82 milligrams rhodium per liter.

The filtrate is again treated by adding 13 milliliters of the sodium borohydride solution to a flask containing 110 milliliters of the filtrate, heating the admixture to reflux temperature, cooling and filtering to obtain a second filtrate comprising 92 milliliters and containing 23 milligrams rhodium per liter.

The rhodium precipitated in the first treatment comprises 88.6 percent of the total rhodium in the residue and that precipitated in the second treatment comprises 9 percent of the total rhodium so that the net recovery from both treatments is 97.6 percent.

When the treatment is repeated with a residue obtained by concentrating, under vacuum, a reaction medium obtained from hydroformylation of propylene with an iridium chlorocarbonyl bis-tritolylphosphine complex; $[(C_6H_4CH_3)_3P]_2Ir(CO)Cl$; and potassium aluminum hydride, substantially the same recovery of the iridium catalyst is achieved. however, the treatment with the strong reducing agent effects conversion of the catalyst complex to the hydride, $[(C_6H_4CH_3)_3P]_3Ir(CO)H$.

When the treatment is repeated with a hydroformylation residue containing rhodium phosphite complex; $[(n-C_4H_9O)_3P]_3Rh(CO)H$; similar recoveries are achieved. When the treatment is repeated with a hydroformylation residue containing an iridium arsine complex; $[(C_6H_5)_3As]_2Ir(CO)Cl$; similarly high recoveries of the iridium are achieved.

EXAMPLE 2

A reaction medium obtained from the hydroformylation of $C_{14}$–$C_{16}$ olefins with a rhodium triphenylphosphine catalyst complex; $[(C_6H_5)_3P]_3Rh(CO)H$; is concentrated by heating to 110° C. under 4–5 millimeters mercury absolute pressure to obtain a reaction residue. The residue is diluted threefold with methanol admixed with 3 weight percent of a copper chromite catalyst comprising 41 weight percent cupric oxide, 44 weight percent chromium oxide and 11 weight percent barium oxide and having an average particle diameter of about ⅛ inch. The resulting slurry is transferred to a half-gallon stainless steel autoclave and pressured to 500 p.s.i.g. with hydrogen, then heated to and maintained at 125° C.. for 15 minutes. The autoclave is then cooled and the contents are removed and filtered. The filtrate is analyzed and found to contain only a minor amount of rhodium. The solid phase is admixed with toluene and the mixture heated to 50° C. with stirring and then filtered. The toluene is found to contain substantially all the rhodium in the residue subjected to the treatment.

Substantially the same results are obtained when the treatment is repeated with the substitution of an equal amount of a catalyst comprising 2.5 weight percent platinum deposited on a Y type synthetic aluminosilicate molecular sieve.

While the preceding examples illustrate the best modes of practice of the invention, it is not intended that these illustrations be construed as unduly limiting of the invention. Instead, it is intended that the invention be defined by the steps, conditions, reagents and their obvious equivalents set forth in the following claims.

I claim:
1. The separation of Group VIII noble metal values from a high-boiling, hydroformylation byproduct stream containing carbonyl residues and a soluble complex of a Group VIII noble metal and a biphyllic ligand having the following formula:

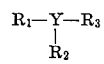

wherein:

Y is As, Sb, P, Bi or $P(O)_3$;

$R_1$ and $R_2$ are hydrogen, alkyl from 1 to 8 carbons, cycloalkyl from 5 to about 9 carbons, aryl from 6 to 9 carbons or amino, halo or alkoxy substitution products thereof;

$R_3$ is alkyl from 1 to 6 carbons, aryl from 6 to 8 carbons or

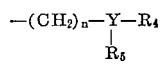

wherein:

$n$ is from 1 to 6;

$R_3$ and $R_4$ are alkyl from 1 to 8 carbons or aryl from 6 to 8 carbons;

which comprises treating said byproduct stream by contacting said stream with an agent selected from the class consisting of: (1) alkali metal aluminum and borohydrides; and (2) hydrogen in the presence of a hydrogenation catalyst, at a temperature from about 10° to 325° C., to effect conversion of the carbonyl content of said stream to hydroxyls and thereby precipitate said complex from said stream.

2. The method of claim 1 wherein said complex is a rhodium containing complex.

3. The method claim 1 wherein Y is phosphorus.

4. The method of claim 1 wherein said agent is an alkali metal borohydride.

5. The method of claim 4 wherein said complex is a rhodium triphenylphosphine complex.

6. The method of claim 1 wherein said agent is hydrogen and said catalyst is a Group VIII or Group VI metal or oxide containing catalyst.

7. The method of claim 1 applied to the treatment of from 1 to about 25 percent of the reaction medium employed in a hydroformylation reaction using said metal complex as a homogeneous catalyst.

References Cited

UNITED STATES PATENTS 3,196,171   7/1965   Gunter et al. _____ 260—414
3,404,185  10/1968   Privette et al. _____ 260—617

HELEN M. McCARTHY, Primary Examiner

A. P. DEMERS, Assistant Examiner

U.S. Cl. X.R.

252—411, 431; 260—604